US 9,208,165 B2

(12) United States Patent
Yuba

(10) Patent No.: US 9,208,165 B2
(45) Date of Patent: Dec. 8, 2015

(54) DATA ARCHIVE SYSTEM

(71) Applicant: Panasonic Corporation, Osaka (JP)

(72) Inventor: Akinori Yuba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 14/135,938

(22) Filed: Dec. 20, 2013

(65) Prior Publication Data

US 2014/0181050 A1    Jun. 26, 2014

(30) Foreign Application Priority Data

Dec. 26, 2012 (JP) .................................. 2012-282173

(51) Int. Cl.
*G06F 17/30* (2006.01)
*G06F 3/00* (2006.01)
*G06F 3/0481* (2013.01)

(52) U.S. Cl.
CPC ...... *G06F 17/30126* (2013.01); *G06F 3/04817* (2013.01); *G06F 17/30073* (2013.01)

(58) Field of Classification Search
CPC ...................... G06F 17/30126; G06F 3/04817
See application file for complete search history.

(56) References Cited

FOREIGN PATENT DOCUMENTS

| JP | 2004-326845 | 11/2004 |
| JP | 2007-73130 | 3/2007 |
| JP | 2011-204311 | 10/2011 |

*Primary Examiner* — William Spieler
(74) *Attorney, Agent, or Firm* — Wenderoth, Lind & Ponack, L.L.P.

(57) ABSTRACT

The data archive system according to the present disclosure includes a client terminal 3, and a NAS device 12 connected to the client terminal 3 via a network 5. The NAS device 12 includes a server 2 and a storage device 1. The storage device 1 includes a drive 7 to record a file on a medium 9. The server 2 stores a file name of the file recorded on the medium 9 by the drive 7 and location information of the medium 9 in association with each other. Upon start of operation of reading a specific file, the client terminal 3 acquires location information of a medium 9 associated with a file name of the specific file from the server 2 via the network 5, and displays different icons according to the location information.

6 Claims, 7 Drawing Sheets

Fig.3

| FOLDER NAME | FILE NAME | MEDIUM ID | LOCATION INFORMATION OF MEDIUM |
|---|---|---|---|
| Folder01 | Test2.txt | 0001 | MAGAZINE STORAGE SHELF OUTSIDE DATA UNIT |
| Folder02 | Test1.txt | 0002 | MAGAZINE STORAGE SHELF OUTSIDE DATA UNIT |
| Folder03 | Test4.txt | 0003 | DRIVE OF DATA UNIT |
| Folder04 | Test3.txt | 0004 | MAGAZINE STOCKER OF DATA UNIT |

Folder00

DATA ARCHIVE SYSTEM

BACKGROUND OF THE INVENTION

1. Field of the Invention

The present disclosure relates to a data archive system handling a large number of files.

2. Description of the Related Art

Data archive systems which handle data by the file by regarding a plurality of hard disks as a mass storage device have come into wide use. This type of data archive system includes a client terminal and a NAS (Network Attached Storage) device connected to the client terminal via a network. The NAS device is an appliance server integrating a hard disk, a network interface, an OS (Operating System), a management utility, and the like.

As a conventional data archive system, for example, a system described in JP 2011-204311 A is known. JP 2011-204311 A discloses a data archive system which uses a data unit as a mass storage device. The data unit disclosed in JP 2011-204311 A includes a plurality of drives and a magazine which holds a plurality of trays for carrying optical disks (hereinafter, referred to as media). The data unit disclosed in JP 2011-204311 A is adapted to pull a tray out from the magazine so that a medium carried on the pulled out tray is to be set on a tray for one of the drives.

PATENT DOCUMENTS

Patent Document 1: JP 2011-204311 A

SUMMARY OF THE INVENTION

In order to increase a mass storage capacity of the conventional data unit, the number of magazines in the data unit may be increased. However, a space inside the data unit is limited. Therefore, for example, a configuration of allowing magazines in the data unit to be exchanged with magazines stored in a magazine storage shelf outside the data unit may be considered. With this configuration, the mass storage capacity of the data unit can be practically increased without increasing the number of magazines in the data unit.

However, since this configuration does not connect the magazine storage shelf to a network, a client terminal cannot access a medium contained in the magazine storage shelf. Then, in order to allow the client terminal to access the medium, the magazine storing the medium needs to be taken out from the magazine storage shelf and loaded in the data unit.

Further, the client terminal, the data unit, and the magazine storage shelf are not necessarily placed close to one another, but may be placed too far from each other for a user operating the client terminal to exchange the magazines. In this case, it takes a considerable time to read a specific file. Thus, it is quite important for the user of the data archive system having the above configuration to know the location of the medium recorded with the specific file. For this reason, it is considered to be very useful for the user to more easily know the location of the medium recorded with the specific file.

The present disclosure therefore provides a data archive system which enables a user to more easily know the location of the medium recorded with a specific file.

In order to achieve the above described object, the data archive system according to the present disclosure includes a client terminal, and a NAS device connected to the client terminal via a network, wherein
the NAS device includes a server and a storage device,
the storage device includes a drive for recording a file on a medium,
the server stores a file name of the file recorded on the medium by the drive and location information of the medium in association with each other, and
upon start of operation of reading a specific file, the client terminal acquires location information of a medium associated with a file name of the specific file from the server via the network, and displays different icons according to the location information.

In accordance with the data archive system according to the present disclosure, a client terminal is adapted to display different icons according to location information of a medium. Therefore, satisfactory visibility is obtained, and the user can more easily know the location of a medium recorded with a specific file.

BRIEF DESCRIPTION OF THE DRAWINGS

These and other aspects and features of the present disclosure will become clear from the following description taken in conjunction with the preferred embodiments thereof with reference to the accompanying drawings, in which:

FIG. 3 is a diagram showing an example of information recorded in the database in the server.

DETAILED DESCRIPTION OF THE INVENTION

Figure 1:
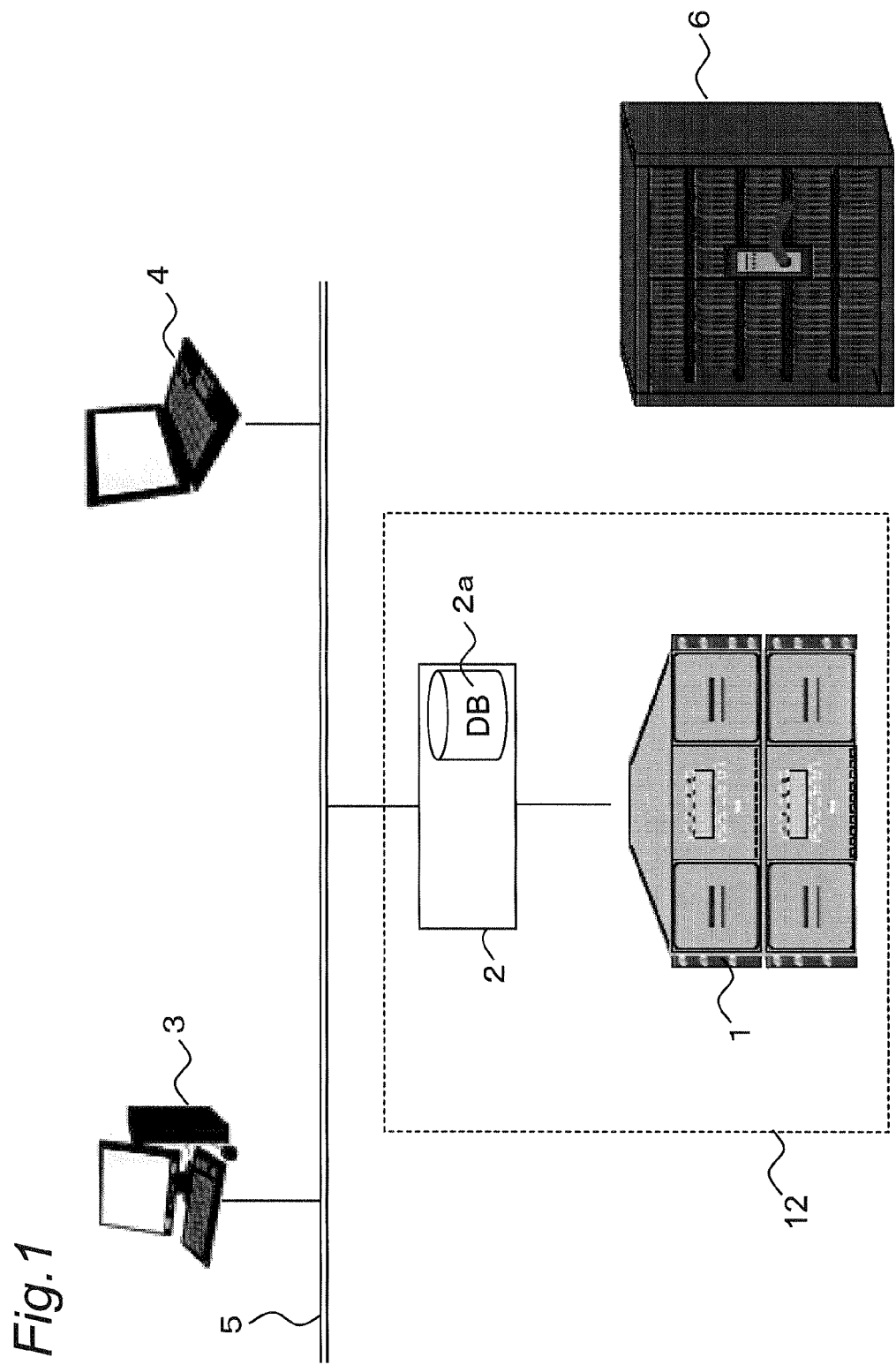
FIG. 1 is a view showing the schematic structure of a data archive system according to an embodiment of the present disclosure.

According to a first aspect of the present disclosure, there is provided a data archive system includes a client terminal, and a NAS device connected to the client terminal via a network, wherein
the NAS device includes a server and a storage device,
the storage device includes a drive to record a file on a medium,
the server stores a file name of the file recorded on the medium by the drive and location information of the medium in association with each other, and
upon start of operation of reading a specific file, the client terminal acquires location information of a medium associated with a file name of the specific file from the server via the network, and displays different icons according to the location information.

According to a second aspect of the present disclosure, there is provided the date archive system according to the first aspect, wherein the icon is attached to an icon of a folder containing the file.

According to a third aspect of the present disclosure, there is provided the date archive system according to the first or second aspect, wherein an icon displayed when the location information is information indicating that the medium is in the storage device is different from an icon displayed when the location information is information indicating that the medium is outside the storage device.

According to a fourth aspect of the present disclosure, there is provided the date archive system according to the first or second aspect, wherein the storage device has a storage to store the medium, and an icon displayed when the location information is information indicating that the medium is in the drive, an icon displayed when the location information is information indicating that the medium is in the storage, and an icon displayed when the location information is information indicating that the medium is outside the storage device are different from one another.

According to a fifth aspect of the present disclosure, there is provided the data archive system according to any one of the first to fourth aspects, wherein the client terminal displays a combination of an icon according to the location information acquired from the server and an icon according to a required read time based on the location information.

According to a sixth aspect of the present disclosure, there is provided the data archive system according to any of the first to fifth aspects, wherein, upon selection of an icon displayed when the location information is information indicating that the medium is outside the storage device, the client terminal displays an inquiry screen for requesting to load the medium in the storage device.

In the following, a detailed description will be given of an embodiment with reference to the drawings as appropriate. It is to be noted that, details more than necessary may not be given. For example, a detailed description of well-known matters or a repetitive description of substantially identical structures may be omitted, for the purpose of avoiding unnecessary redundancy in the following description, to facilitate understanding of the person skilled in the art.

It is to be noted that, the inventors provide the accompanying drawings and the following description in order for the person skilled in the art to fully understand the present disclosure. Accordingly, such drawings and description are not intended to limit the subject of the invention defined in the claims.

Embodiment

A description will be given of a date archive system according to an embodiment of the present disclosure. FIG. 1 is a view showing the schematic structure of a data archive system according to this embodiment.

In FIG. 1, the data archive system according to this embodiment includes a browse terminal 3 (hereinafter, referred to as the client terminal), NAS device 12, management terminal 4, and magazine storage shelf 6.

The client terminal 3 is a computer that use functions and data provided by NAS device. The client terminal 3, NAS device 12, and management terminal 4 is connected to a network 5, respectively. On the other hand, the magazine storage shelf 6 is not connected to the network 5.

The NAS device 12 includes a date unit 1 exemplifying a storage device, and server 2.

Figure 2A:
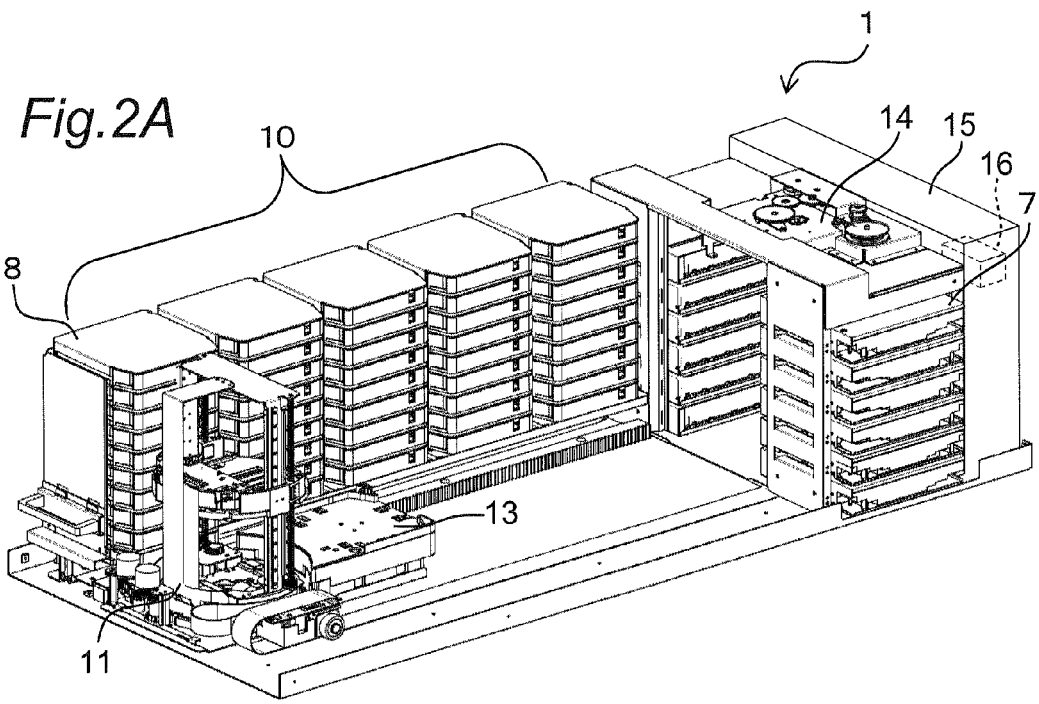
FIG. 2A is a perspective view showing the schematic structure of the data unit.
Figure 2B:
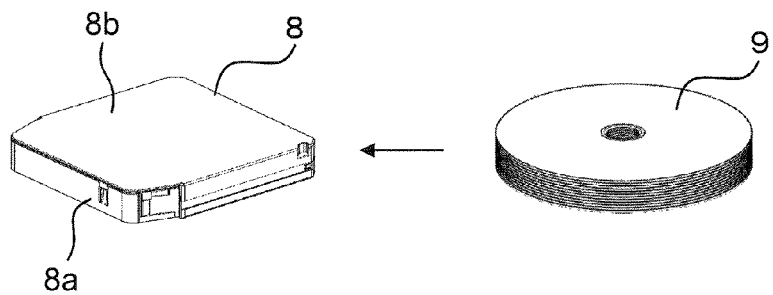
FIG. 2B is a perspective view of a magazine and a plurality of medium included in the data unit shown in FIG. 2.

FIG. 2A is a perspective view showing the schematic structure of the data unit 1. FIG. 2B is a perspective view showing a magazine and a plurality of optical disc 9 (hereinafter, referred to as the medium) included in the data unit.

The data unit 1 includes two magazine stockers 10, 10, exemplifying a storage for storing the magazines 8. The two magazine stockers 10, 10 are provided so as to oppose to each other. It is to be noted that, in FIG. 2A, one of the magazine stockers 10 (on the near side) is not shown. Further, the top panel and the partition plate of the magazine stocker 10 are not shown in FIG. 2A.

Each of the magazine stockers 10 stores a plurality of magazines 8. In the present embodiment, each of the magazine stockers 10 stores 45 magazines 8. As shown in FIG. 2B, each of the magazines 8 has a magazine tray 8a for carrying a plurality of media 9 and a case 8b for housing the magazine tray 8a. In the present embodiment, the magazine tray 8a is adapted to carry 12 pieces of BD-R (Blu-ray Disc Recordable) of 100 GB (gigabytes) as media 9. In this case, one magazine 8 has a storage capacity of 1.2 TB (terabytes) and the whole data unit 1 has a storage capacity of 108 TB (=1.2 TB×45×2).

Further, in the present embodiment, each of the magazines 8 is attached with an RFID tag (not shown) such as a medium ID which stores information about the plurality of media 9 held in the magazine 8. Hereinafter, the information stored in the RFID tag will be referred to as tag information. The data unit 1 incorporates a reader/writer (not shown) for reading and writing the tag information from and into the RFID tag.

Between the two magazine stockers 10, 10, a picker 11 that draws out the magazine tray 8a from one magazine 8 selected from a plurality of magazines 8 and that holds the magazine tray 8a is provided. The picker 11 is structured to convey the held magazine tray 8a to a position near a plurality of drives 7 arranged at the device-rear side. The picker 11 is integrally provided with a lifter 13 that pushes out a plurality of media 9 from the magazine tray 8a.

The drives 7 are each an apparatus that performs recording or reproducing of file on or from one medium 9. Further, the drives 7 are each a tray-scheme drive that load medium 9 using tray. It is noted that the drives 7 may be a device for recording and reproducing of file on or from one medium 9. The plurality of drives 7 are stacked in a device height direction, and arranged so as to be adjacent to the magazine stockers 10, 10 on the device-rear side. Between the plurality of drives 7 arranged as being stacked so as to be adjacent to one magazine stocker 10 and the plurality of drives 7 arranged as being stacked so as to be adjacent to the other magazine stocker 10, a carrier 14 is provided.

The carrier 14 is structured to: retain a plurality of media 9 pushed out by the lifter 13 in such a stacked state; separate one medium from the retained plurality of media 9 above a tray (not shown) ejected from an arbitrary drive 7; and place the separated medium on the tray.

On the further device-rear side than the carrier 14 and the plurality of drives 7, an electric circuit and a power supply 15 are provided. The electric circuit and the power supply 15 are provided with a controller 16 that controls operations (motor and the like) of devices such as the picker 11, the drives 7, the carrier 14, and the like.

The controller 16 is connected to the server 2. As shown in FIG. 1, the server 2 is connected to the client terminal 3 and the management terminal 4 via the network 5.

The server 2 includes a database 2a. The database 2a stores a file name of the file recorded on the medium 9 by the drive 7 and location information of the medium 9 in association with each other.

FIG. 3 is a diagram showing an example of information recorded in the database 2a in the server 2. An entry includes a folder name, a file name, a medium ID, and location information of a medium. Herein, the folder name refers to the name of a folder containing a file recorded on a medium. The medium ID refers to an identification number of a medium. The location information of a medium is information indicating the location of the medium. In the present embodiment, there are three types of location information of a medium such as information inside the drive 7 of the data unit 1, information inside the magazine stocker 10 of the data unit 1, and information in the magazine storage shelf 6 outside the data unit 1. However, the present disclosure is not limited thereto, and the location information of a medium may be two types of information such as information inside the data unit 1 and information outside the data unit 1, or may be four or more types of information.

In the present embodiment, a media administrator performs an operation to take the magazine 8 out from the magazine stocker 10 and put the magazine 8 into the magazine storage shelf 6. At the time of performing the operation, the media administrator uses the management terminal 4 to specify the magazine 8 to be taken out and to also reserve the magazine storage shelf 6 as a destination of the magazine 8. Thereafter, when the media administrator takes the magazine 8 out from the magazine stocker 10, a reader/writer (not shown) in the data unit 1 can no longer read tag information from the RFID tag attached to the taken-out magazine 8. At this time, the data unit 1 notifies this fact to the server 2. The server 2 updates the location information, stored in the database 2a, of the media corresponding to the specified magazine 8 with the reserved destination.

On the other hand, when the media administrator loads the magazine 8 taken out from the magazine storage shelf 6 or the like in the magazine stocker 10, the reader/writer reads the tag information from the RFID tag attached to the loaded magazine 8 and sends the tag information to the server 2. The server 2 takes the information indicating that the magazine 8 is in the magazine stocker 10 as the location information of the media, associates the location information with the tag information, and records them in the database 2a.

Figure 4:
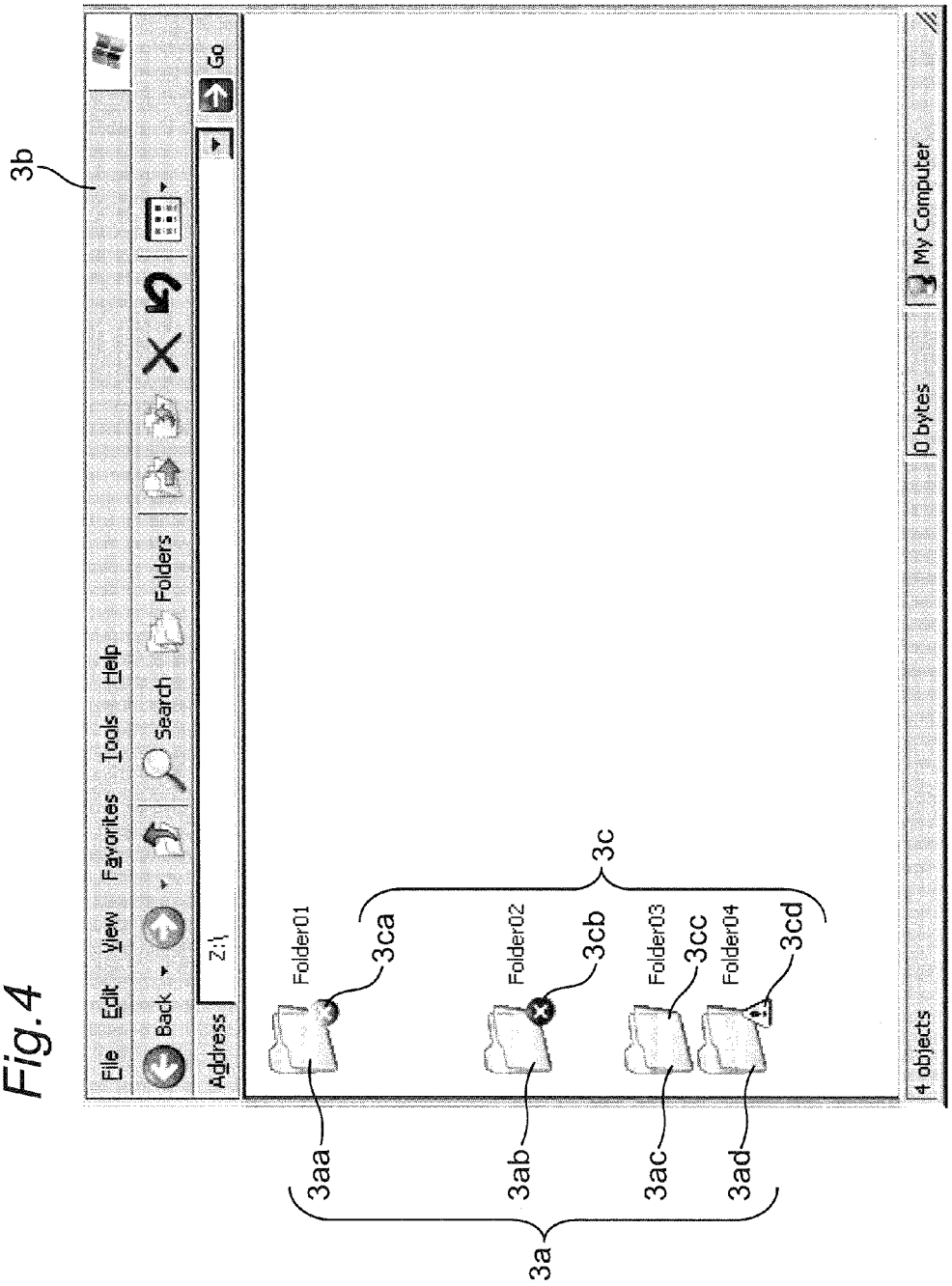
FIG. 4 is a diagram showing an example of screen shown on a display of the client terminal when the file reading operation is performed.
Figure 5:
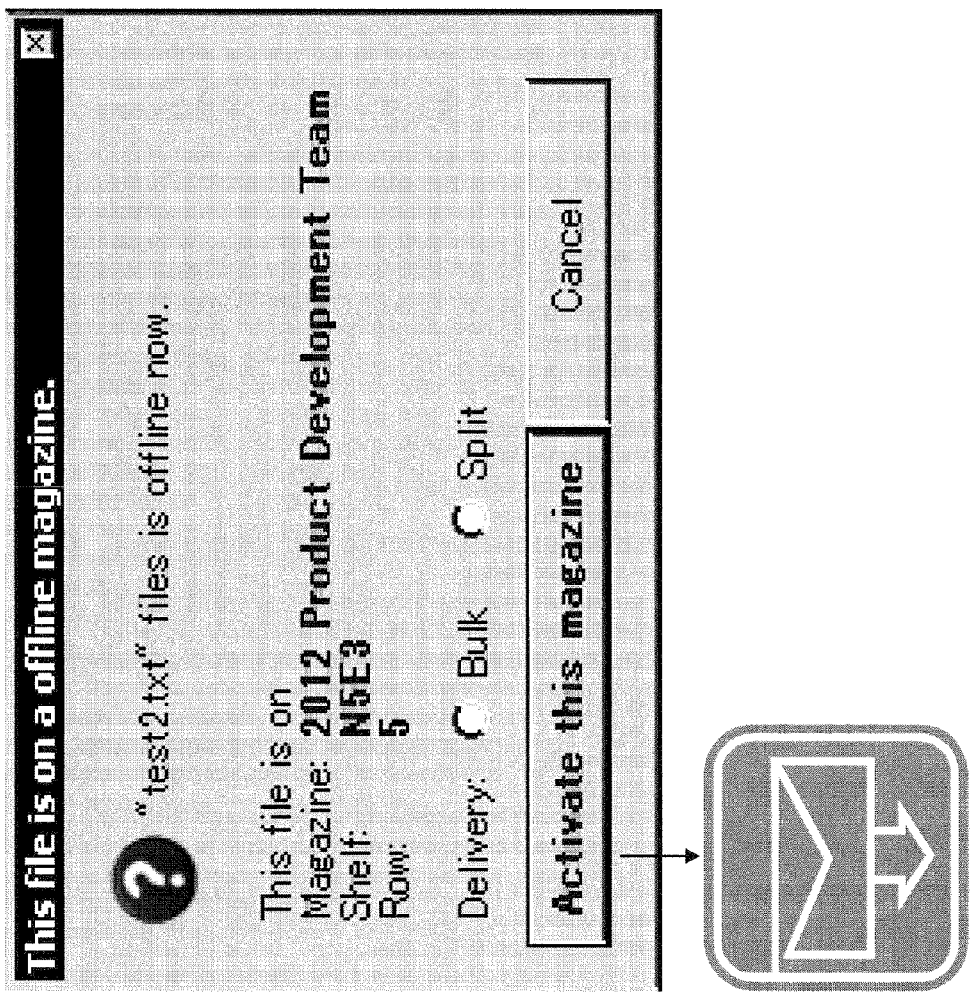
FIG. 5 is a diagram showing an example of an inquiry screen for requesting to load a medium.
Figure 6:
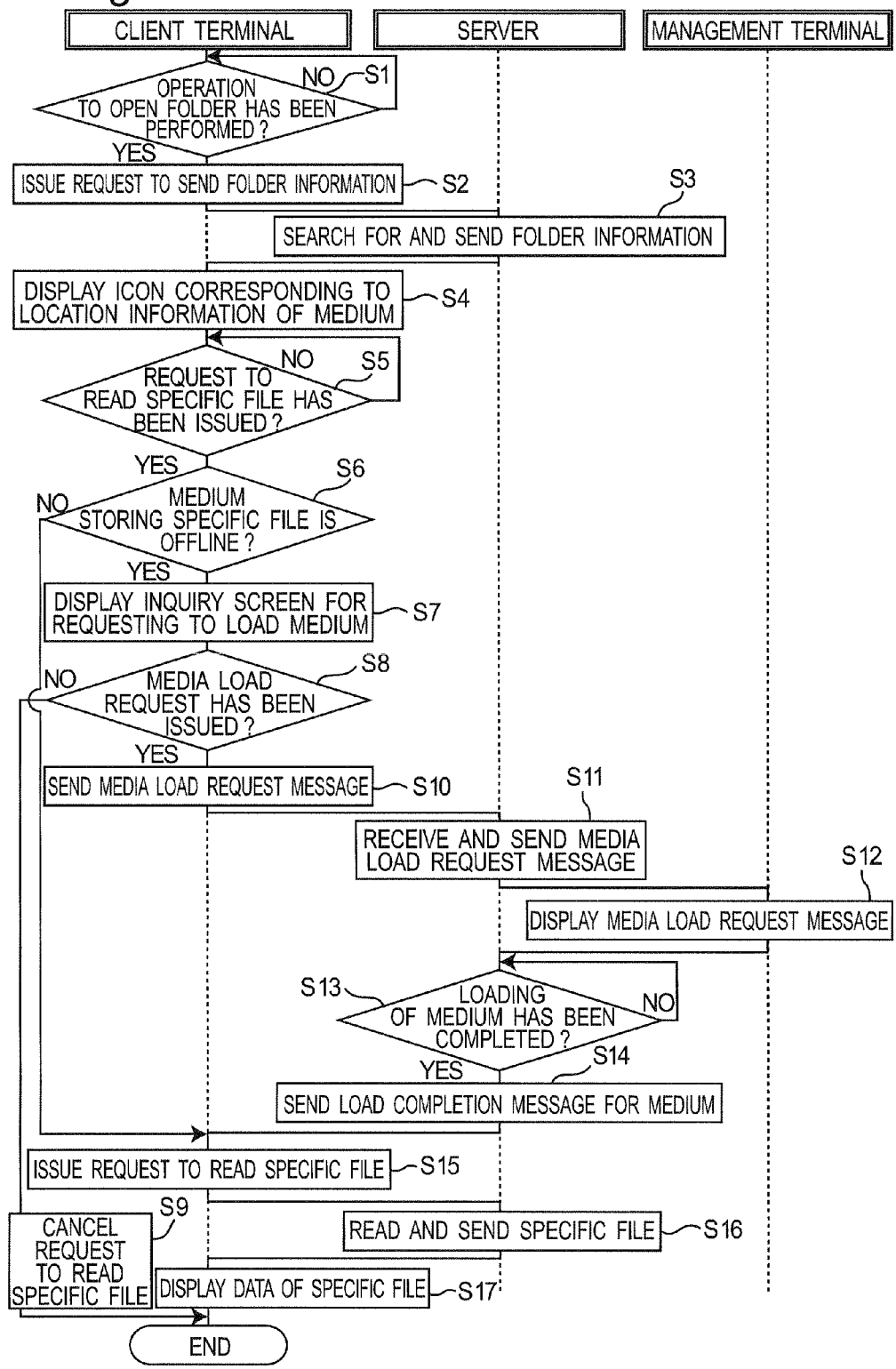
FIG. 6 is a flow chart showing the file reading operation.

Next, an operation to read a specific file using the client terminal 3 (hereinafter, referred to as file reading operation) will be described with reference to FIGS. 1 to 6. FIG. 4 is a diagram showing an example of screen shown on a display of the client terminal 3 when the file reading operation is performed. FIG. 5 is a diagram showing an example of an inquiry screen for requesting to load a medium. FIG. 6 is a flow chart showing the file reading operation.

First, in step S1 in FIG. 6, the client terminal 3 determines whether or not the user has performed an operation to open a folder (for example, Folder00 shown in FIG. 3) stored in the database 2a of the server 2. In other words, the client terminal 3 determines whether or not the operation to read a specific file has been started. When the user has performed the operation to open a folder, the process proceeds to step S2. The operation to open a folder includes an operation to acquire a list of file names, for example.

In step S2, the client terminal 3 issues a request to the server 2 to send folder information (Folder00) via the network 5.

In step S3, the server 2 searches for the folder name, the file name, and the location information of the media 9 contained in the folder information (Folder00) requested by the client terminal 3 by referencing the database 2a, and sends them to the client terminal 3.

In step S4, the client terminal 3 displays icons on the display based on the location information of the media 9 sent from the server 2. For example, as shown in FIG. 4, the client terminal 3 displays icons 3a of the respective folders on the display 3b. In the present embodiment, the client terminal 3 is adapted to attach, to the icons 3a of the folders, icons 3c indicating the location information of the media 9 recorded with the files in the folders.

In the example shown in FIG. 4, the four folders Folder01 to Folder04 constitute the folder information (Folder00). As shown in FIG. 3, the folders contain files Test1.txt to Test4.txt, respectively.

In FIG. 4, icons 3aa and 3cb (icons with X-mark in circle) attached to icons 3aa and 3ab of Folder01 and Folder02 indicate that the media 9 recorded with the files Test1.txt and Test2.txt are in the magazine storage shelf 6 outside the data unit 1. From the icons 3ca and 3cb, the user can instantly recognize that the media 9 recorded with the files Test1.txt and Test2.txt are in the magazine storage shelf 6. In addition, the user can assume that it takes a long time (for example, 10 minutes) to read the files Test1.txt and Test2.txt.

Also in FIG. 4, an icon 3cc (no icon) attached to an icon 3ac of Folder03 indicates that the medium 9 recorded with the file Test4.txt is in the drive 7 of the data unit 1. Although no icon is treated as a kind of icon in the present embodiment, the icon 3cc may be as simple as a circle, for example. From the icon 3cc, the user can instantly recognize that the medium 9 recorded with the file Test4.txt contained in Folder03 is in the drive 7. In addition, the user can assume that it takes only a short time (for example, 10 seconds) to read the file Test4.txt.

Also in FIG. 4, an icon 3cd (icon with "!" in a triangle) attached to an icon 3ad of Folder04 indicates that the medium 9 recorded with the file Test3.txt is in the magazine stocker 10 of the data unit 1. From the icon 3cc, the user can assume that it takes a little time (for example, 1 minute) to read the file Test3.txt contained in Folder04.

In step S5, the client terminal 3 determines whether or not a request to read a file in a specific folder has been issued by the user. In the case where the request to read a file in a specific folder has been issued by the user, the process proceeds to step S6.

In step S6, the client terminal 3 determines whether or not it can communicate with the medium 9 recorded with a specific file and for which a read request is issued via the network 5, that is, whether or not the medium 9 is offline. When the medium 9 is offline, the process proceeds to step S7. When the medium 9 is online, the process proceeds to step S16 described later. For example, in the case where a request to read the file Test1.txt or Test2.txt is issued, the media 9 are offline as they are located in the magazine storage shelf 6. Thus, the process proceeds to step S7. On the other hand, in the case where a request to read the file Test3.txt or Test4.txt is issued, the media 9 are online as they are located in the data unit 1. Thus, the process proceeds to step S16.

step 37, the client terminal 3 shows an inquiry screen for requesting the media administrator to take out the magazine 8 which holds the media 9 recorded with the specific file from the magazine storage shelf 6 and load the magazine 8 in the data unit 1 (hereinafter, referred to as media load request screen) on the display. FIG. 5 is an example of the media load request screen indicating that the file "Test2.txt" is currently offline.

In step S8, the client terminal 3 determines whether or not the user has issued a media load request. In the case where the media load request is not issued (for example, in the case where "Cancel" button in FIG. 5 is pressed), the process proceeds to step S9. On the other hand, in the case where a media load request is issued (for example, in the case where "Activate this magazine" button in FIG. 5 is pressed), the process proceeds to step S10.

In step S9, the client terminal 3 cancels the request to read the specific file. As a result, the file reading operation ends.

In step S10, the client terminal 3 sends a media load request message to the server 2.

In step S11, the server 2 sends the media load request message received from the client terminal 3 to the management terminal 4. The media load request message may be sent by various means such as electronic mail or SMS (Short Message Service).

In step S12, the management terminal 4 receives the media load request message and shows the message on the display.

In step S13, by monitoring the change in the states of the magazines 8 in the data unit 1, the server 2 determines whether or not the media administrator has taken out the magazine 8 which holds the media 9 recorded with the specific file from the magazine storage shelf 6, and loaded the magazine 8 in the magazine stocker 10. When the media administrator has loaded the magazine 8 in the magazine stocker 10 and the server 2 has detected the completion of the loading of the magazine 8, the process proceeds to step S14.

In step S14, the server 2 sends a load completion message of the media 9 to the client terminal 3.

In step S15, the client terminal 3 issues a request to the server 2 to read the specific file requested in step S5.

In step S16, the server 2 reads the specific file and sends data of the read specific file to the client terminal 3.

In step S17, the client terminal 3 shows the data of the specific file received from the server 2 on the display. With this, the file reading operation ends.

According to the present embodiment, the client terminal 3 is adapted to display the different icons 3c according to the location information of the medium 9. Therefore, satisfactory visibility is obtained, and the user can more easily know the location of a medium 9 recorded with a specific file.

The icons 3c may be displayed in place of the icons 3a of the folders, instead of being attached to the icons 3a of the folders as shown in FIG. 4. Alternatively, the icons 3c may be attached to icons of the files. In this case, however, the attachment of the icons 3c may degrade visibility of the icons of the files and the icons 3c since there are various icons of the files. In contrast, in the case where the icons 3c are attached to the icons 3a of the folders storing the files as in the present embodiment, there is no particular problem even if the visibility of the icons 3a of the folders is degraded, because the icons 3a of the folders are usually uniform in design. On the contrary, the attachment of the icons 3c to the icons 3a of the folders having a uniform appearance rather improves the visibility of the icons 3c.

Preferably, the client terminal 3 displays a combination of an icon according to the location information of a medium acquired from the server 2 and an icon according to a required read time based on the location information. For example, in the example shown in FIG. 7, icons 3d and 3e according to the location information of the media acquired from the server 2 are distinguished from each other by their shapes, whereas icons 3f, 3g, and 3h according to the required read times are distinguished from each other by their colors.

Figure 7:
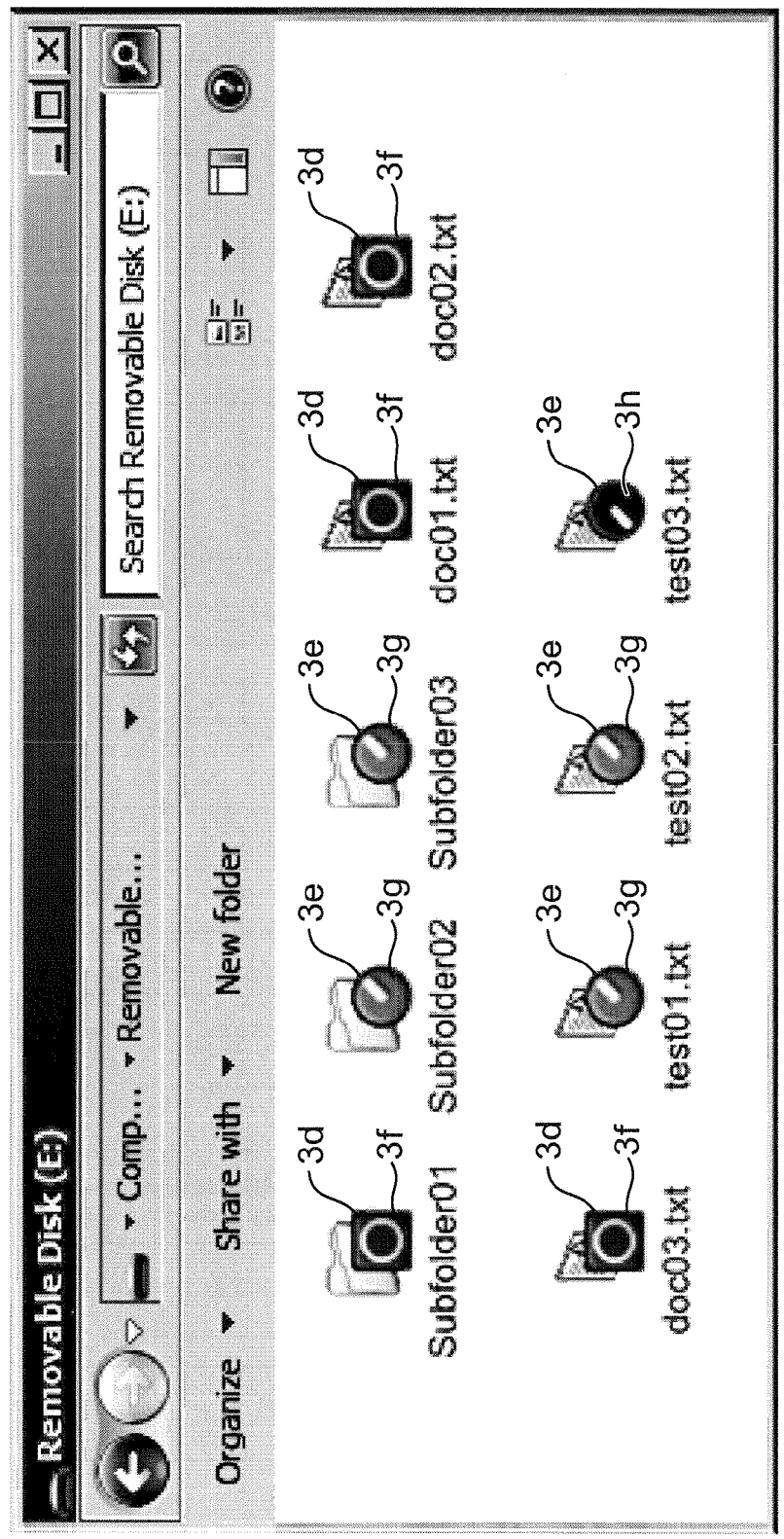
FIG. 7 is a diagram showing another example of screen shown on a display of the client terminal when the file reading operation is performed.

More specifically, in the example shown in FIG. 7, square icons 3d indicate that the medium 9 is located inside the drive 7 of the data unit 1, and round icons 3e indicate that the media 9 are not located inside the drive 7. From the shapes of the icons 3d and 3e, the user can easily know the location of the media 9 recorded with the files in the folders.

Also, in the example shown in FIG. 7, the icons 3f are, for example, blue icons and indicate that the required read time is 10 seconds. The icons 3g are, for example, orange icons and indicate that the required read time is 1 minute. The icon 3h is, for example, a black icon and indicates that the required read time is 10 minutes. From the colors of the icons 3f, 3g, and 3h, the user can easily know the time required to read the files in the folders.

That is, in the example shown in FIG. 7, a combination of the icons 3d and 3e according to the location information of the media acquired from the server 2, and the icons 3f, 3g, and 3h according to the required read times is displayed. Thus, from the shapes and colors of the icons, the user can easily and simultaneously know both the locations of the media recorded with the files in the folders and the time required to read out the files in the folders.

Although the medium 9 has been described as an optical disk in the above described embodiment, the present disclosure is not limited thereto. The medium 9 may be, for example, an optical tape.

Although the database 2a stores a file name of a file recorded on the medium (optical disk) 9 by the drive 7 and the location information of the medium (optical disk) 9 in association with each other in the above described embodiment, the present disclosure is not limited thereto. In the data archive system according to the above described embodiment, all optical disks in the magazine 8 are simultaneously loaded in the drives 7, and therefore, it is possible to regard the magazine 8 as one medium and consider that the magazine 8 is loaded in the drive 7. As a result, it is also possible to cause the database 2a to store the location information of the magazine 8 as the location information of media in association with the file names. That is, the location information may be dealt by units of magazines instead of units of optical disks.

Although 12 pieces of media 9 are held in the magazine 8 in the above described embodiment, the number of pieces of media 9 is not limited to 12, and may be less than or more than 12.

In the foregoing, the embodiment has been described in order to illustrate the technique of the present disclosure. The accompanying drawings and the detailed description are provided therefor. Accordingly, the constituents shown in the accompanying drawings and the detailed description may contain not only the constituents essential for solving the problem, but also the constituents not being essential but presented for the purpose of illustrating the technique. Therefore, those non-essential constituents in the accompanying drawings or the detailed description should not be immediately determined as being essential on the basis of those non-essential constituents being shown in the accompanying drawings or the detailed description.

Further, since the foregoing embodiment is an illustration of the technique of the present disclosure, various changes, replacements, additions, or eliminations can be made within the scope of claims and equivalents thereof.

The disclosures of Japanese Patent Applications No. 2012-282173 filed on Dec. 26, 2012 including specification, drawing and claims are incorporated herein by reference in its entirety.

With the date archive system of the present disclosure, a user can more easily know the location of the medium recorded with a specific file. Accordingly, it is particularly useful for a date archive system handling a large number of files.

What is claimed is:

1. A data archive system comprising:
a client terminal; and
a NAS device connected to the client terminal via a network, wherein
the NAS device includes a server and a storage device,
the storage device includes a drive to record a file on a medium,
the server stores a file name of the file recorded on the medium by the drive and location information of the medium in association with each other, and upon start of operation of reading a specific file, the client terminal acquires location information of a medium associated with a file name of the specific file from the server via the network, and displays different icons according to the location information.

2. The data archive system according to claim 1, wherein the icon is attached to an icon of a folder containing the file.

3. The data archive system according to claim 1, wherein an icon displayed when the location information is information indicating that the medium is in the storage device is different from an icon displayed when the location information is information indicating that the medium is outside the storage device.

4. The data archive system according to claim 1, wherein the storage device has a storage to store the medium, and
an icon displayed when the location information is information indicating that the medium is in the drive, an icon displayed when the location information is information indicating that the medium is in the storage, and an icon displayed when the location information is information indicating that the medium is outside the storage device are different from one another.

5. The data archive system according to claim 1, wherein the client terminal displays a combination of an icon according to the location information acquired from the server and an icon according to a required read time based on the location information.

6. The data archive system according to claim 1, wherein, upon selection of an icon displayed when the location information is information indicating that the medium is outside the storage device, the client terminal displays an inquiry screen for requesting to load the medium in the storage device.

* * * * *